No. 11,787.
Reissued Nov. 14, 1899.
C. R. MESTON.
ELECTRIC MOTOR.
(Application filed Aug. 21, 1899.)
2 Sheets—Sheet 1.
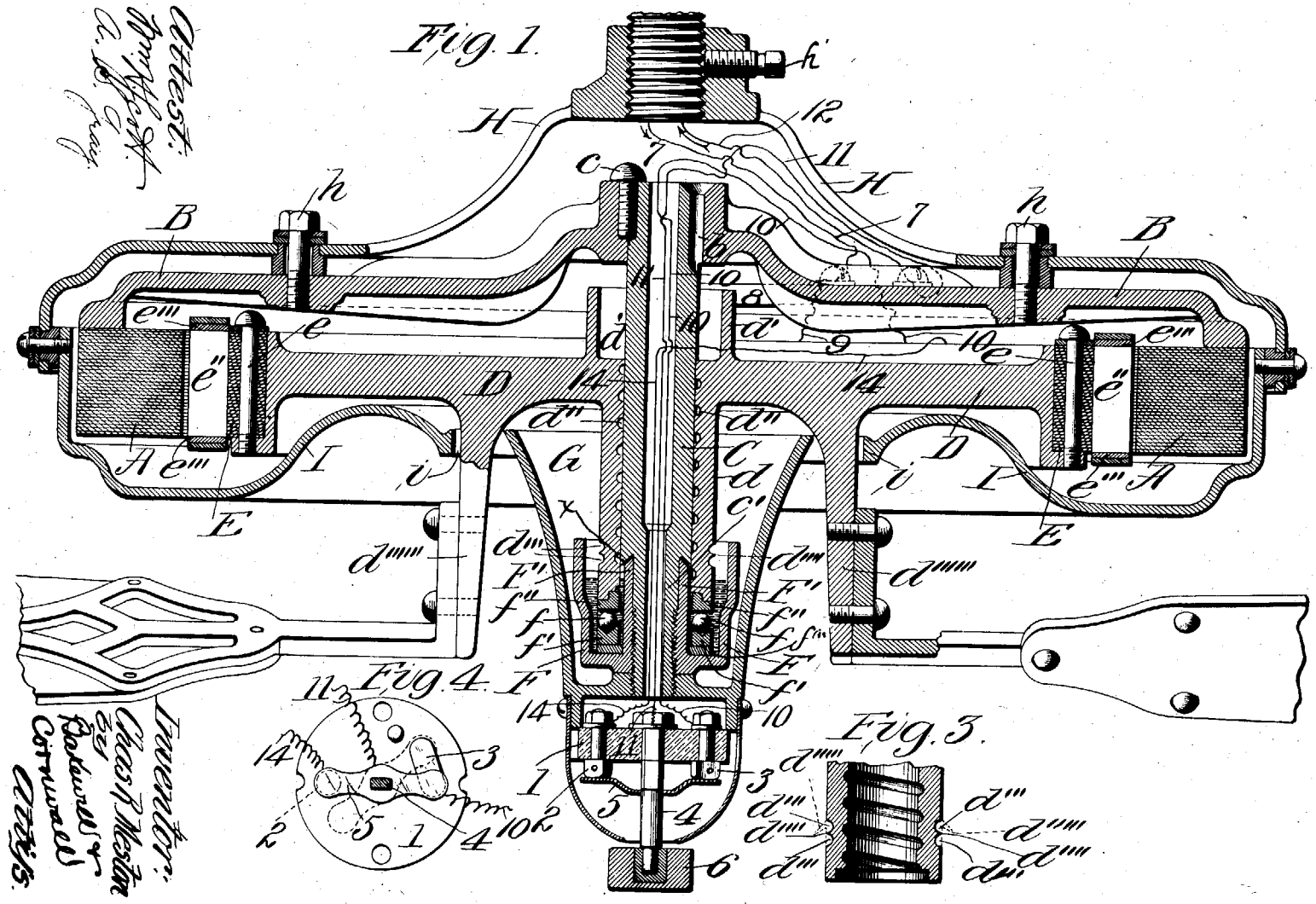

No. 11,787. Reissued Nov. 14, 1899.
C. R. MESTON.
ELECTRIC MOTOR.
(Application filed Aug. 21, 1899.)
2 Sheets—Sheet 2.
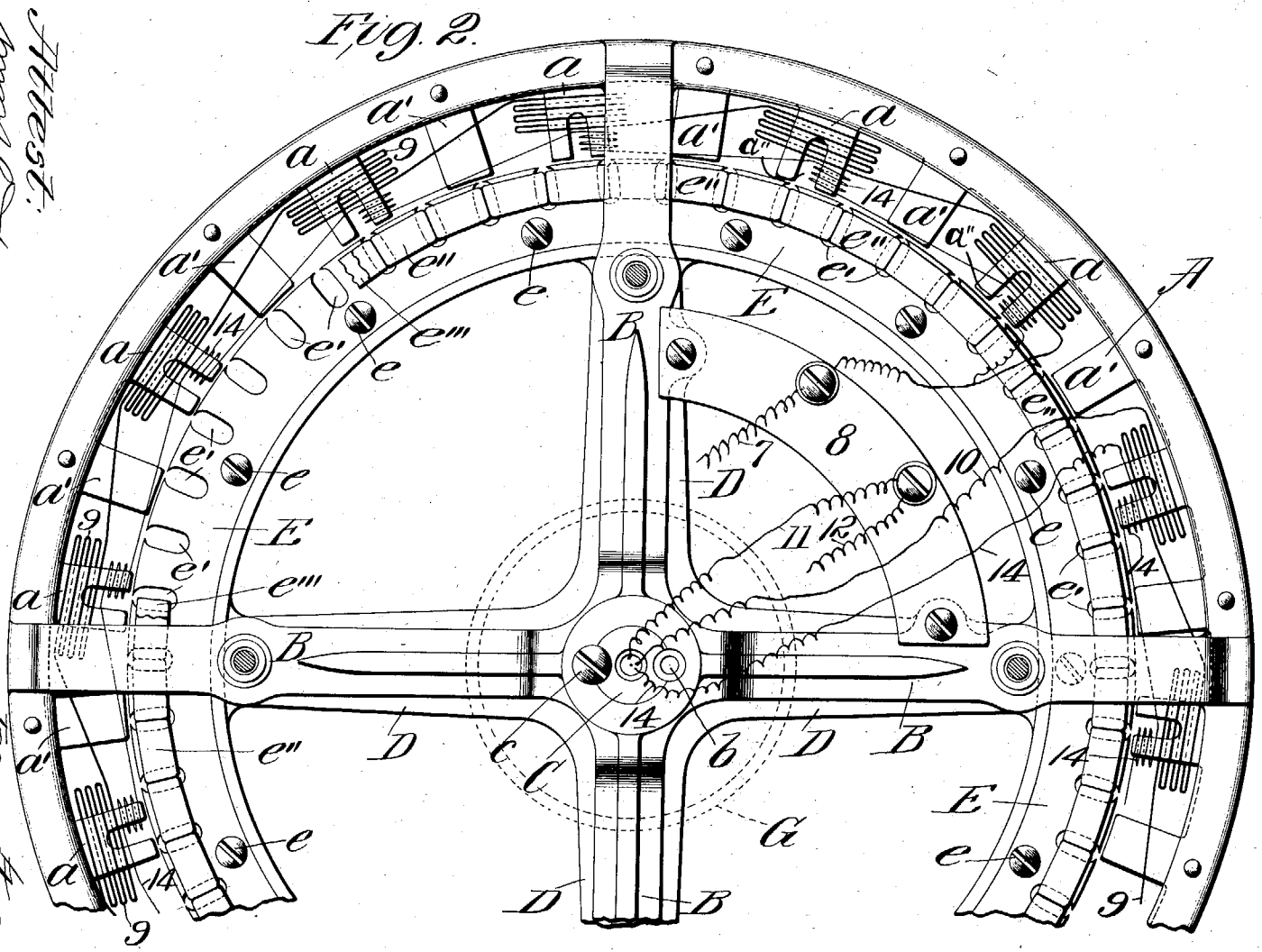
Attest:
Wm. H. Coit.
A. S. Gray
Inventor:
Charles R. Meston
by Bakewell & Cornwall
Att'ys.

UNITED STATES PATENT OFFICE.

CHARLES R. MESTON, OF ST. LOUIS, MISSOURI, ASSIGNOR TO THE EMERSON ELECTRIC MANUFACTURING COMPANY, OF SAME PLACE.

ELECTRIC MOTOR.

SPECIFICATION forming part of Reissued Letters Patent No. 11,787, dated November 14, 1899.

Original No. 617,114, dated January 3, 1899. Application for reissue filed August 21, 1899. Serial No. 727,960½.

*To all whom it may concern:*

Be it known that I, CHARLES R. MESTON, a citizen of the United States, residing in the city of St. Louis, State of Missouri, have invented a certain new and useful Improvement in Electric Motors, of which the following is a full, clear, and exact description, such as will enable others skilled in the art to which it appertains to make and use the same, reference being had to the accompanying drawings, forming part of this specification.

This invention relates to a certain new and useful improvement in electric motors, and particularly to that type commercially known as "ceiling fan-motors," wherein the motor is suspended from the ceiling and the fan-blades are mounted directly upon the armature. The motor belongs to that class known as "induction-motors" and has no commutator or brushes.

The object of this present invention is to provide a simple, inexpensive, and efficient antifriction-motor.

Another object is to construct the field-magnet core and winding for alternating-current motors of the induction type, wherein alternate polar projections are wound in such manner that but one-half of the usual number of coils are required. In motors of this type on the market, and I speak particularly of those used for ceiling-fans, there are twenty-eight polar projections, each of which polar projections is wound with two coils, making fifty-six coils in all. In my present invention, where only alternate polar projections are wound, but twenty-eight coils are employed for accomplishing the same work heretofore requiring twice the number of coils. Having a fewer number of coils, less work is required to make connections, and the field-magnet core and its windings are therefore cheaper and simpler. The decreased diameter of the field-magnet core, which is about nine inches in the present form as compared with fourteen inches in old style, is also of advantage.

Figure 1 of the drawings is a vertical sectional view of my improved electric motor. Fig. 2 is a top plan view of the same, the casing being removed. Fig. 3 is a detail view in section of the lower end of the armature-sleeve or hollow shaft, showing the spiral groove contained therein; and Fig. 4 is an inverted plan view of the switch-block controlling my improved electric motor.

The essential features of this invention reside, first, in the novel form of field pole-pieces and wiring of the field, wherein alternate polar projections are bifurcated and wound, while the remaining polar projections are plain and left unwound. The invention also consists in the windings of these bifurcated polar projections; and, finally, the invention consists in the novel construction, arrangement, and combination of the several parts, all as will hereinafter be described, and afterward pointed out in the claims.

In the drawings, A indicates the core of the field-magnet, circular in plan view, which core is provided with internal radially-extending polar projections $a$ and $a'$, said core being secured to a suitable support or frame B, from the center of which depends a shaft C, said shaft being secured to said frame by means of a screw $c$. This shaft C forms a support or bearing for the armature support or frame D, said armature-frame being provided with an extended bearing or hub $d$, encircling said shaft C and provided with an internally-disposed spiral groove, the object of which will hereinafter be explained.

E indicates the armature-core, being secured to the frame D in any suitable manner, but preferably by screws $e$. This armature-core is composed of laminations of thin sheet-iron, as is well understood, and is formed with openings or slots $e'$, one end of which terminates in the periphery of said armature-laminations. Through these openings $e'$ I insert copper strips $e''$ of sufficient length to permit the ends thereof to be bent over and rest flatly against the outer faces of the outside laminations, so as to produce a complete contact-strip on both of the outer sides of said laminations. The strips $e''$ are the induced-current-conducting bars of the armature and are short-circuited by their bent ends contacting with each other, which short-circuiting of the strips is insured by the use of the copper ring $e'''$. The use of the ring $e'''$ is not absolutely essential, as in the manufacture of the armature the bent ends of the strips or bars $e'$ are preferably dipped in solder.

Shaft C, as before stated, is secured to the frame B and extends, preferably, downwardly a suitable distance, upon which shaft C the armature-frame D is positioned, which frame, as also before stated, is provided with an extended bearing or hub $d$, said hub also extending, preferably, in a downward direction. The lower end $c$ of shaft C is reduced in diameter and extends somewhat below the end of the hub $d$, where it is provided with a suitable screw-thread, designed to receive, first, an oil-cup F, which is screwed thereon, and, second, an inverted-bell-shaped housing or guard G, designed to protect the oil-cup F and the bearings from dust, &c., as well as to prevent the oil being thrown outwardly from the motor. Between the lower end of the hub $d$ and the upper face of the bottom of the oil-cup F is interposed an antifriction-bearing, consisting of a series of hardened-steel balls $f$, which travel or rest upon an annular-shaped track or way $f'$, placed in the bottom of the oil-cup, and preferably the lower end of the hub $d$ is provided with a hardened-steel ring or bearing $f''$, which rests directly upon the steel balls.

Rising from the bottom of oil-cup F and inside of the series of balls $f$ and their bearings is a cylindrical portion F', in the internal lower portion of which a screw-thread for engaging the shaft C is formed, the upper end of said portion F' being provided with a beveled edge or conical face, which is seated upon a gasket $x$, interposed between said conical face and a corresponding conical face $c''$, formed at the juncture of the shaft C with the reduced portion $c$. The internal diameters of the hub $d$ and the bearing-rings $f'$ and $f''$ are approximately the same, while the outside diameter of the cylindrical portion F' is somewhat smaller, thus leaving a sufficient clearance between such parts for the free circulation of oil.

The armature-frame D is provided upon its upper face with a reservoir $d'$, encircling the shaft C, and in this reservoir the upper end of the spiral groove $d''$ terminates, while its lower end terminates at the lower end of the hub $d$, forming a spiral channel around the shaft C from the reservoir $d'$ to the lower or central portion of the oil-cup. When it is desired to supply the machine with lubricant, the reservoir $d'$ is partially filled with oil, preferably through the hole $b$, formed directly above the reservoir in the frame B. The lubricant when the motor is not running passes downwardly through the spiral groove $d''$, around and onto shaft C, and into the oil-cup F. Enough oil should be supplied to wholly submerge the end of the hub $d$, the balls, and their respective bearings. It will be seen that the rotation of the armature and armature-frame D, in which latter the spiral groove $d''$ is formed, its pitch being in the proper direction, will force the oil up through said spiral groove, lubricating the shaft C, and any overflow of said oil from the spiral groove will be received in the reservoir $d'$. When the motor is again in a position of rest, the lubricant will flow to the oil-cup F, as before described.

The spiral groove operates practically on the principle of an internal Archimedean screw, the cup F forming the source of supply from which the oil is drawn while the motor is running, the overflow or elevated oil being received in a reservoir in readiness to again return to cup F when the motor stops or the speed is reduced so as to be insufficient to continue to force the oil upward or hold it in the reservoir. The pitch of the groove is also a factor with respect to the maintenance of the oil in the reservoir $d'$. The greater the pitch the higher will be the speed required to effect this result, while a lower speed is all that is necessary to cause the elevation of the oil where a slight pitch is employed. Of course it will be understood that the oil-elevating groove is pitched in one direction for a motor running in a certain direction and pitched oppositely for a motor running in a reverse direction.

It will be noticed that the lower end of the oil-elevating groove terminates some distance above the balls, so that at no time is it possible for the oil to be entirely taken away from said balls, the balls rather running while being submerged in oil.

In order to render the motor noiseless, I arrange a leather or other suitable washer $f'''$ under the annular ball-ring $f'$, which also to some extent cushions the armature.

As the oil has a tendency to climb the outer periphery of hub $d$ when the armature is rotating, I provide means to interrupt and defeat said climbing before the oil reaches a point above the oil-cup. This is accomplished by two annular grooves $d'''$, placed close together, between which is left an annular flange or pointed projection $d''''$. Should the oil pass the lower groove, it will be thrown off by centrifugal force back into the oil-cup. Instead of the two grooves $d'''$ I may form an annular flange $d'''''$, projecting beyond the periphery of the hub $d$, as shown by dotted lines in Fig. 3, which flange $d'''''$ will perform the functions of the part $d''''$.

Depending from the frame D are lugs or arms $d''''''$, to which I secure the fan-blades; but it is obvious that there are other means of securing these arms.

In order to protect the motor from as much dust as possible, as well as to form a protective and ornamental housing, I secure to the field-magnet frame, preferably insulated therefrom by means of screws $h$, the cap-piece H, said cap-piece being screw-threaded in its center to receive the end of a supporting rod or pipe. This rod or pipe is locked in position by a set-screw $h'$ in the cap-piece H. A bottom casing I is placed in proper position and secured by any suitable means to the cap-piece H, said bottom piece being preferably formed with an opening $i$, through which the bearing and the inverted bell-shaped housing G pass. Suitably secured to the lower portion of the bell-shaped housing is a switch designed to be manually operated in starting or stopping the motor. This switch may be briefly described as follows: On the base 1 of the switch are arranged two contacts 2 and 3, preferably diametrically opposite each other, the latter contact being elongated, as shown in Fig. 4. In the center of the base is mounted a staff 4, said staff being non-circular in cross-section for a portion of its length, said non-circular portion carrying or having secured thereto a yielding brush or switch-blade 5. Staff 4 is also provided with a handle 6 to facilitate manipulation, as is obvious.

I will now describe the winding of the field-magnets.

The supply and return wires are led to the motor through the hollow tube or pipe by which the motor is suspended.

7 indicates the supply-wire, which is connected to a post mounted on insulation-piece 8, bolted to the framing B. From this binding-post the wire is led to the field-windings, which are shown more clearly in Fig. 2. The polar projections $a$ are formed with open-ended slots $a''$ in their inner ends, so that they are bifurcated a portion of their length, while the polar projections $a'$ are solid and alternate with the bifurcated projections $a$.

The main windings (indicated by the coils 9) are arranged on the body portions of the bifurcated polar projections $a$ and are preferably connected in series, all of said polar projections being wound in the same direction. From the last coil the wire, which I will call 10, leads down through the hollow shaft C and is connected to the switch-contact 3. When the switch-blade 5 is on the point 3, the current is completed through said blade, the staff 4, wire 11, which is connected to a binding-post on insulation-piece 8, and through wire 12 back through the suspending-tube for the motor.

From the above it will be seen that alternate poles in the field-magnet, being wound in the same direction, are similarly polarized, while the remaining polar projections are blank and have an opposite polarity. This method of winding reduces the number of coils used in the field about one-half without materially decreasing the efficiency of the motor.

Leading from wire 7 is a wire 14, which is coiled about one prong of the bifurcated end of the polar projection $a$ in the same direction as the main coil 9, this winding continuing from polar projection to polar projection, where it is wound in the same direction as the main coils onto one prong of each of said polar projections. These coils are what I term "starting" or "phase" coils and may or may not be cut in contemporaneously with the main coils. From the starting or phase coils the wire 14 leads to the contact-point 2 of the switch, which when the switch-blade 5 is in contact therewith completes the circuit through the starting or phase coils and back through wires 11 and 12. However, when the switch-blade is turned, as indicated by the dotted lines in Fig. 4, these starting or phase coils are cut out, which may result in decreasing the speed of the motor about one-half. These starting or phase coils being placed on one prong of the pole projections around which the main coils are wound have a tendency to intensify the magnetism at the prong around which they are wound, thus unbalancing the magnetism of the pole, which results in the armature or rotary element being subjected to a greater amount of torque in starting. In order to start the motor, it is necessary to establish the torque or twisting action on the rotary element, so that the motor can get up speed, after which if it is desired to change the speed the starting-coils may be cut out. As alternating currents are employed, the phase-coils, affecting but a portion of each pole, will cause the magnetism of the field-magnets to vary in magnetic intensity at different moments, and therefore I have termed the starting-coils as "phase-coils" for purposes of distinction, as said starting or phase coils while not changing the phase of the current will produce a resultant magnetism equivalent to magnetism produced by a multiphase winding.

In starting the motor having the system of winding shown the switch-blade 5 is placed so as to contact with the plate 3 and point 2 for the purpose of cutting in the phase-coils. These phase-coils and the main coils produce an asymmetric field, which is utilized to start the motor, after which the phase-coils may be cut out by removing the switch-blade from the contact 2, and the motor will then run with a symmetrical field, in which the main coils only are employed. The operation therefore where this system of winding is employed is, first, to cut in the phase-coils before starting, and then when the motor has reached the desired speed to cut out said phase-coils to reduce the amount of operating-current, which also results in reducing the speed somewhat. When a higher speed is required, the phase and main coils operate together by putting the switch-blade 5 in contact with the terminal 2. A two-speed motor is thus produced by the proper relative proportions of the two circuits, both of which are arranged to be controlled by a switch to start, stop, or cause the motor to run at a high or low speed.

While I have shown the main and phase coils as being arranged in parallel series, yet it is obvious that there are various forms of windings which can be employed in connection with the bifurcated polar projections, and therefore I do not wish to be limited to the exact form of winding shown in connection with the field-core, except where such winding is specially mentioned in the claims.

The particular construction of the bearing forms the subject-matter of a divisional application, and I therefore do not claim the same here, said divisional application having been issued as Patent No. 622,247, dated March 28, 1899.

Having thus described my invention, what I claim, and desire to secure by Letters Patent, is—

1. In a motor, the combination with a suspending-tube, of a plate H secured to said tube, a frame-plate B secured to plate H but insulated therefrom, a field-magnet core supported by frame B, a fixed shaft depending from frame B, an armature mounted on said fixed shaft, and fan-blades secured to said armature; substantially as described.

2. In a motor, the combination with supporting means, of a motor-frame, insulation between said means and the motor-frame, field-magnets, an armature-core, induced-current-conducting bars in said armature-core which are short-circuited on each side of the armature, and fan-blades mounted on said armature; substantially as described.

3. The combination with supporting means, of a motor-frame, insulation between said motor-frame and supporting means, a fixed shaft depending from the motor-frame, an armature on said fixed shaft, fan-blades carried by said armature, and a bottom plate secured to an insulated supporting-frame for inclosing the field-magnets and armature-core; substantially as described.

4. The combination with a motor comprising field-magnets and an armature, of an insulated frame-plate for supporting said parts, and a bottom plate for inclosing said parts, said bottom plate being secured to the insulated frame-plate; substantially as described.

5. The combination with a motor-frame, of a fixed shaft depending therefrom, an armature mounted on said fixed shaft, fan-blades mounted on the armature, suitable bearings for said armature, a housing for said bearing and a switch for the motor-circuit, which switch is mounted on said housing; substantially as described.

6. The combination with a field-core provided with alternate polar projections which are bifurcated, of main coils which are all wound in the same direction and connected in series, and phase or starting coils which are all wound in the same direction and are arranged on one prong of said bifurcated polar projections, said phase or starting coils being, also, connected in series; substantially as described.

7. The combination with a field-core provided with alternate polar projections which are bifurcated, of main coils which are all wound in the same direction and connected in series, phase or starting coils which are all wound in the same direction and are arranged on one prong of said bifurcated polar projections, said phase or starting coils being, also, connected in series, and a switch for cutting in the main coils only, or the main and phase or starting coils together; substantially as described.

8. The combination with a field-core provided with alternate polar projections which are bifurcated, of main coils on said bifurcated polar projections which are wound in the same direction and connected in series, and phase or starting coils which are wound in the same direction as the main coils and are arranged on one prong of said bifurcated polar projections, said phase or starting coils being, also, connected in series; substantially as described.

9. The combination with a laminated field magnet core, formed with the polar projections $a$ and $a'$, the former of which are bifurcated, of main coils wound in the same direction on said bifurcated polar projections, and connected in series, and phase or starting coils which are wound in the same direction, and connected in series, said phase or starting coils being arranged on one prong of said bifurcated polar projections; substantially as described.

10. The herein-described field-magnet core consisting of a laminated ring provided with polar projections on its inner periphery, alternate polar projections being bifurcated; substantially as described.

11. The herein-described field-magnet core, consisting of a laminated ring provided on its inner periphery with polar projections, alternate polar projections being provided with open-ended slots, and the remaining polar projections being plain, and windings on the body portions of the bifurcated polar projections, and one prong of their bifurcated ends; substantially as described.

12. The combination with a laminated field-core formed with polar projections, every other one of which is bifurcated, main coils on the body portions of said bifurcated polar projections, and phase-coils on one prong of said bifurcated polar projections, alternate pole-pieces being plain and unwound; substantially as described.

13. In an induction-motor, the combination with an armature, of a field-core provided with polar projections, main coils on alternate polar projections, phase or starting coils which include but a portion of said polar projections, whereby, when the field-poles are energized, the phase or starting coils cause the center of magnetism to be laterally displaced to produce an asymmetric field, which asymmetric field is merged into a symmetric field when the main coils attain their maximum value; substantially as described.

In testimony whereof I hereunto affix my signature, in the presence of two witnesses, this 8th day of August, 1899.

CHARLES R. MESTON.

Witnesses:
F. R. CORNWALL,
A. S. GRAY.